US008903362B2

(12) United States Patent
Kolaks et al.

(10) Patent No.: US 8,903,362 B2
(45) Date of Patent: Dec. 2, 2014

(54) RULE-BASED DEVICE TIMEOUT AND SECURITY ACCESS

(71) Applicant: AT&T Intellectual Property I, L.P., Atlanta, GA (US)

(72) Inventors: Marc Kolaks, St. Louis, MO (US); Joseph Richmeyer, Desoto, MO (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 13/693,724

(22) Filed: Dec. 4, 2012

(65) Prior Publication Data
US 2014/0155029 A1 Jun. 5, 2014

(51) Int. Cl.
H04M 1/66 (2006.01)
H04W 12/08 (2009.01)
H04W 12/06 (2009.01)
H04L 29/06 (2006.01)

(52) U.S. Cl.
CPC .............. *H04W 12/08* (2013.01); *H04W 12/06* (2013.01); *H04L 63/108* (2013.01)
USPC ........ 455/411; 455/414.1; 455/418; 455/419; 455/550.1; 455/552.1

(58) Field of Classification Search
CPC .................... H04M 1/72519; H04M 1/72563; H04W 8/245; H04W 24/04; H04W 12/08; H04W 12/06; H04L 29/08936
USPC ........ 455/418, 419, 420, 550.1, 552.1, 553.1, 455/556.2, 566
See application file for complete search history.

(56) References Cited

U.S. PATENT DOCUMENTS

| 8,649,391 | B2 * | 2/2014 | Munje ........................... 370/437 |
| 2004/0153263 | A1 | 8/2004 | Holle |
| 2004/0202117 | A1 | 10/2004 | Wilson et al. |
| 2005/0044436 | A1 | 2/2005 | Holle |
| 2009/0143114 | A1 * | 6/2009 | Vargas et al. ................. 455/574 |
| 2009/0280872 | A1 * | 11/2009 | Kajiya et al. .................. 455/574 |
| 2010/0016028 | A1 * | 1/2010 | Takenaka et al. ............. 455/566 |
| 2010/0317324 | A1 * | 12/2010 | Brown et al. ................. 455/411 |
| 2011/0136545 | A1 * | 6/2011 | Dai ............................... 455/566 |
| 2012/0289217 | A1 * | 11/2012 | Riemer et al. ................ 455/418 |

OTHER PUBLICATIONS

Priyantha, Bodhi et al., "EERS: Energy Efficient Responsive Sleeping on Mobile Phones," Microsoft Research, sensorlab.cs.darmouth.edu/phonesense/papers/Priyantha-EERS.pdf, Oct. 27, 2010, pp. 1-5.
Dynamic Power Management Policies for Embedded Systems, cseweb.ucsd.edu/~gdhimanGaurav_files/CSE-237A/TopicResearch/DPMPolicies.htm, pp. 1-3, Nov. 19, 2002.
Dynamic Power Management Policies for Embedded Systems, IBM and MontaVista Software, Version1.1, Nov. 19, 2002, pp. 1-25.

* cited by examiner

*Primary Examiner* — Khai M Nguyen

(57) ABSTRACT

Devices, methods and computer-readable media for controlling a device timeout parameter are disclosed. For example, a device receives a condition for modifying a timeout parameter and a modification. The device then detects the condition for modifying the timeout parameter and applies the modification to the timeout parameter in response to detecting the condition. A method determines a maximum time for a timeout parameter of a device and transmits a message to the device indicating the maximum time for the timeout parameter. A further method determines a condition for modifying a timeout parameter of a device and a modification. The method then transmits a message to the device indicating the condition for modifying the timeout parameter of the device and the modification.

18 Claims, 6 Drawing Sheets

RULE-BASED DEVICE TIMEOUT AND SECURITY ACCESS

The present disclosure relates generally to computing devices and, more particularly, to modifying and controlling device timeouts and access to devices based upon one or more rules.

BACKGROUND

Mobile devices are typically configured with one or two access timeouts based on a last interaction with a device. For example, a first timeout may blank the screen. A second timeout may then require that a password be entered the next time an attempt is made to interact with the device. In addition, the second timeout may place the device in a sleep mode where one or more components of the device are powered down. Both of the timeouts provide a certain degree of power conservation in addition to different levels of security and privacy. For instance, the first timeout turns off the screen, which both saves power and prevents others from seeing what may have been left on the screen, e.g., if the user walked away but did not turn off the device. Similarly, the second timeout may power off certain components of the device, thereby saving battery life, while at the same time, requiring a password may deter unauthorized access of the device.

SUMMARY

In one embodiment, the present disclosure discloses a device, method and computer-readable medium for controlling a timeout parameter for a device. For example, the device receives a condition for modifying a timeout parameter and a modification. The device then detects the condition for modifying the timeout parameter and applies the modification to the timeout parameter in response to detecting the condition.

In another embodiment, the present disclosure discloses an additional device, computer-readable medium and method for controlling a timeout parameter for a device. For example, the method determines a maximum time for a timeout parameter of the device and transmits a message to the device indicating the maximum time for the timeout parameter.

In still another embodiment, the present disclosure discloses another device, computer-readable medium and method for controlling a timeout parameter of a device. For example, the method determines a condition for modifying a timeout parameter of the device and a modification. The method then transmits a message to the device indicating the condition for modifying the timeout parameter of the device and the modification.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses methods, computer-readable media and apparatuses for controlling device timeout parameters. Although the present disclosure is discussed below in the context of a cellular network architecture, the present disclosure is not so limited. Namely, the present disclosure can be applied to other types of networks, such as a local area network (LAN) or wireless local area network (WLAN), an Internet Protocol network, such as an Internet Protocol/Multi-Protocol Label Switching (IP/MPLS) core network, an IP Multimedia Subsystem (IMS) network, communications over the Internet in general, and so forth.

Figure 1:
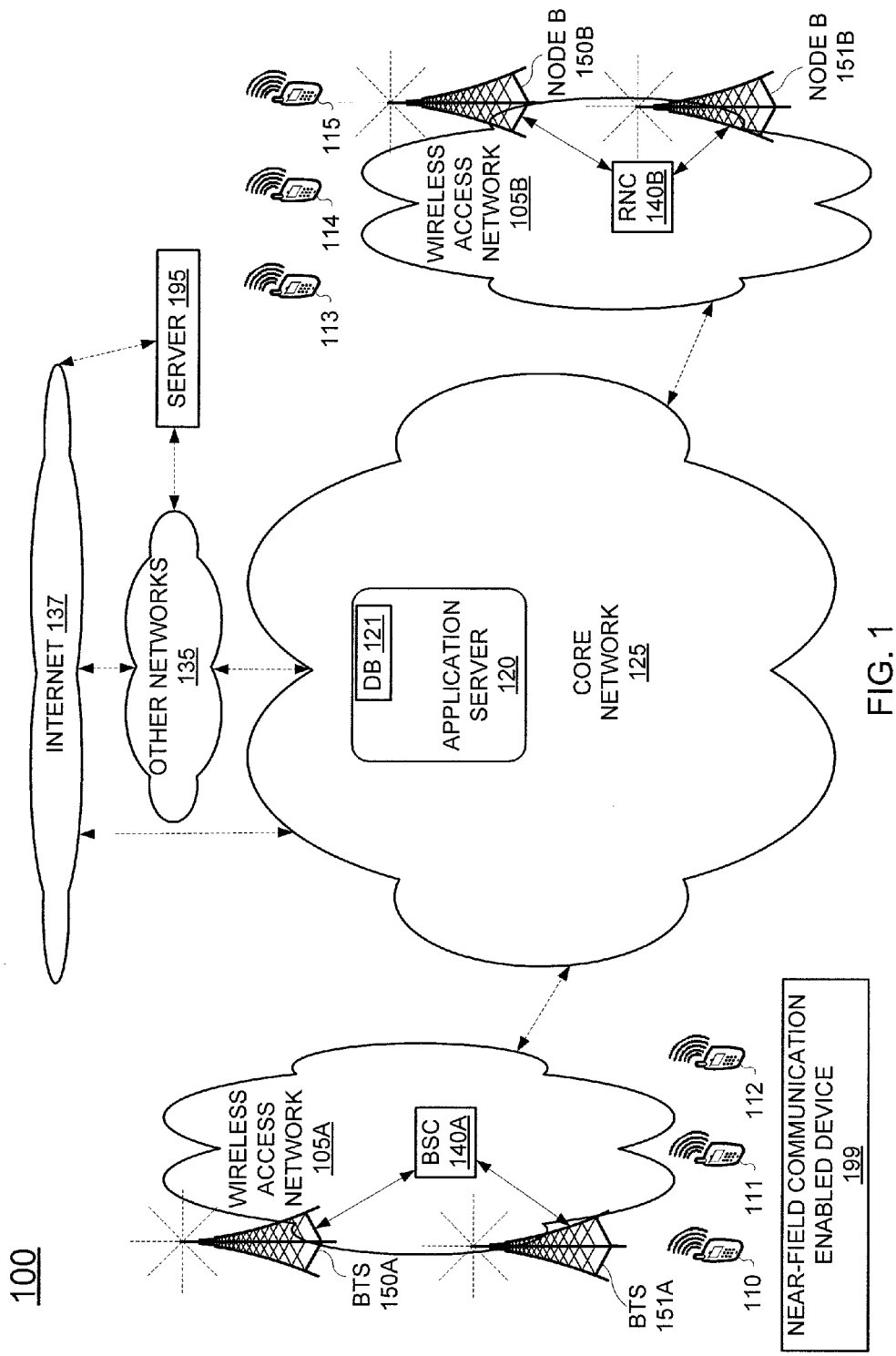
FIG. 1 illustrates an exemplary system related to the present disclosure.

To better understand the present disclosure, FIG. 1 illustrates an example system, or network 100 (e.g., a network having an integrated cellular network architecture), related to the present disclosure. In particular, network 100 includes exemplary wireless access networks 105A and 105B, and a core network 125 (e.g., a public land mobile network (PLMN)-General Packet Radio Service (GPRS) core network), suitable for implementing embodiments of the present disclosure for controlling device timeout parameters. In one embodiment, the core network 125 operates on top of a multi-protocol label switching (MPLS) backbone network. Wireless access network 105A may comprise a radio access network implementing such technologies as: global system for mobile communication (GSM), e.g., a base station subsystem (BSS), or IS-95, among others. In other words, wireless access network 105A may comprise an access network in accordance with any "second generation" (2G) network technology. In the illustrative embodiment, wireless access network 105A is shown as a GSM radio access network.

In addition, wireless access network 105B may comprise substantially similar components and functions to those found in wireless access network 105A. However, wireless access network 105B may comprise a universal mobile telecommunications system (UMTS) network employing wideband code division multiple access (WCDMA), or a CDMA2000 network, among others. In other words, wireless access network 105B may comprise a network in accordance with any "third generation" (3G), "fourth generation" (4G), Long Term Evolution (LTE) or any other yet to be developed future wireless/cellular network technology. In the illustrative embodiment, wireless access network 105B is shown as a UMTS terrestrial radio access network (UTRAN) subsystem. Thus, the present disclosure is not limited to any particular type of wireless access network.

Referring to wireless access network 105A, the access network is configured to facilitate communication between endpoint devices 110-112 and endpoint devices 113-115 of another wireless access network, such as wireless access network 105B. It should be noted that the communication can also be one-way, such as retrieving a news page over the Internet 137. In fact, the communications may be facilitated with other networks 135 which may comprise any packet switched or circuit switched networks, e.g., public land mobile networks (PLMNs), Voice over Internet Protocol (VoIP) networks, Service over Internet Protocol (SoIP) networks, Asynchronous Transfer Mode (ATM) networks, Frame Relay networks, a local area network (LAN), a wireless LAN (WLAN), a metropolitan area network (MAN), an enterprise network and the like, and the Internet 137. For example, communications may be facilitated with a server 195 (e.g., a web server, an enterprise server, a personal computer and the like) via network 135 and/or the Internet 137.

In one embodiment, the endpoint devices 110-115 may comprise any endpoint devices configured for wireless communication such as personal computers, laptop computers, Personal Digital Assistants (PDAs), mobile phones, smart phones, email devices, tablets, messaging devices, and the like. In one embodiment, the physical links between wireless endpoint devices 110-112 and the wireless access network 105A comprise radio frequency (RF) signals between the one or more base stations 150A-151A (e.g., base transceiver stations (BTSs)) and the endpoint devices 110-112. In one embodiment, one or more of the endpoint devices 110-115 may be located near (i.e., within communication range) of a near-field communication enabled device 199. For example, endpoint devices 110-112 are shown proximate to near-field communication enabled device 199, which may comprise a vehicle, a sensor, such as a radio frequency identification (RFID) tag, a temperature sensor or an optical sensor, a speaker, a display or other such device equipped to communicate via Bluetooth or another near-field communication protocol.

To manage the communications of multiple users serviced by the wireless access network 105A, the wireless access network 105A may comprise one or more network elements. For example, wireless access network 105A may comprise one or more base station controllers (BSCs) for managing RF communication of the base stations 150A-151A. In some embodiments the BSC 140A may provide transcoding functions between wireless communication formats used by the base stations 150A-151A and endpoint devices 110-112 and Internet Protocol (IP) formats used by wireless access network 105A, core network 125, Internet 137, other networks 135 and so forth.

As mentioned above, wireless access network 105B (e.g., a UMTS UTRAN radio access network) may comprise substantially similar components with substantially similar functions to those described in connection with wireless access network 105A (e.g., a GSM radio access network). For example, base stations 150B-151B (referred to as NodeBs in UMTS-UTRAN terminology) may functional in substantially the same manner as base stations 150A-151A (referred to as BTSs in GSM 2G terminology). In addition, radio network controller (RNC) 140B (e.g., a 3G UMTS RNC) may provide substantially similar functionality to that of a 2G GSM base station controller (BSC), such as BSC 140A in wireless access network 105A.

Each of wireless access network 105A and 105B may interface with core network 125. In one embodiment, core network 125 includes components of a public land mobile network (PLMN) to support voice calls from and among users/endpoint devices. For example, core network 125 may include one or more mobile switching centers (MSCs) for each wireless access network that forms part of the network architecture 100, a home location register (HLR), as well as serving GPRS support nodes (SGSNs), gateway GPRS support nodes (GGSNs), and related support components including media servers, application servers, and the like. For purposes of clarity and simplicity, these exemplary components and others are not shown in FIG. 1.

The core network 125 may also include, in one embodiment, an application server (AS) 120. The application server 120 may include a database (DB) 121. In one embodiment, the DB 121 stores device timeout parameters and/or maximum and minimum values for such device timeout parameters for one or more devices, as will be described in greater detail below. In one embodiment, application server 120 may comprise any hardware server or computer that is well known in the art, and the database 121 may be any type of electronic collection of data that is also well known in the art.

The foregoing description of an integrated cellular network architecture 100 is provided as an illustrative example only. In other words, the embodiment of network 100 is merely illustrative of one network configuration that is suitable for implementing embodiments of the present disclosure. Thus, the present disclosure may also include any other different network configurations that are suitable for implementing embodiments for controlling device timeout parameters. For example, one or more of the wireless access networks 105A and 105B and/or core network 125 could include components in accordance with GSM evolution (EDGE) networks, Long Term Evolution (LTE) networks, and so on.

In addition, as mentioned above, the present disclosure is not limited to a cellular/wireless network environment, but is broadly applicable to other types of communication networks for conveying communications between devices. For example, the Core Network 125 may comprise an IP multimedia subsystem (IMS) network, or any other network for conveying communications among endpoint devices and between endpoint devices and other components (e.g., core network, access network components and so forth). Similarly, in other embodiments, any one of the wireless/cellular access networks 105A and 105B may comprise a non-cellular access network such as a wireless local area network (WLAN), an IEEE 802.11 network, a "wired" access network, e.g., a local area network (LAN), an enterprise network, a metropolitan area network (MAN), a digital subscriber line (DSL) network, a cable network, and so forth. As such, any of the endpoint devices 110-115 may comprise a non-cellular device such as a personal computer, a laptop computer, a Wi-Fi device, a tablet, a server (e.g., a web server), and so forth, or may have both cellular and non-cellular access capabilities. Additional details and variations of this nature are omitted for simplicity and to improve clarity of understanding with respect to the claimed embodiments. Thus, for the purposes of the following discussion, it is assumed that the described embodiments are implemented within the exemplary embodiment of network 100 depicted in FIG. 1.

Figure 2:
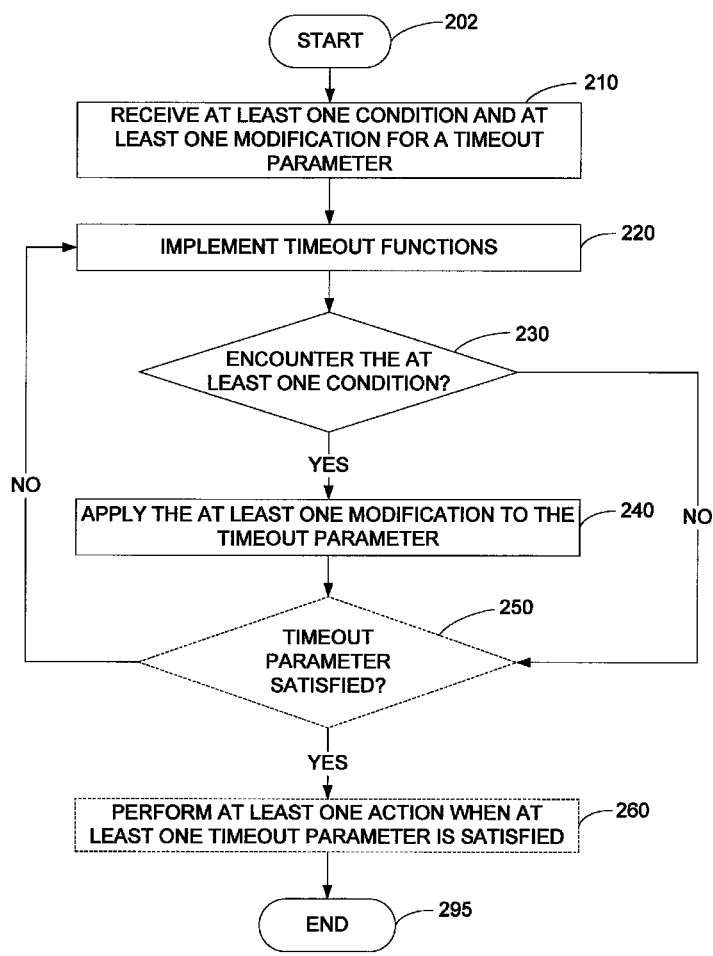
FIG. 2 illustrates a flowchart of a method for controlling a device timeout parameter according to the present disclosure.

FIG. 2 illustrates a flowchart of a method 200 for controlling a device timeout parameter. In one embodiment, the steps, operations or functions of the method 200 may be performed by any one or more of the components of the network 100 depicted in FIG. 1. For example, in one embodiment, the method 200 is performed by one of the endpoint devices 110-115 in FIG. 1. Alternatively, or in addition, one or more steps, operations or functions of the method 200 may be implemented by a general purpose computer having a processor, a memory and input/output devices as illustrated below in FIG. 6, specifically programmed to perform the steps, functions and/or operations of the method. Although any one of the elements in core network 125, wireless access network 105A and/or wireless access network 105B, may be configured to perform various steps, operations or functions of the method 200, the method will now be described in terms of an embodiment where operations of the method are performed at an endpoint device.

Figure 3:
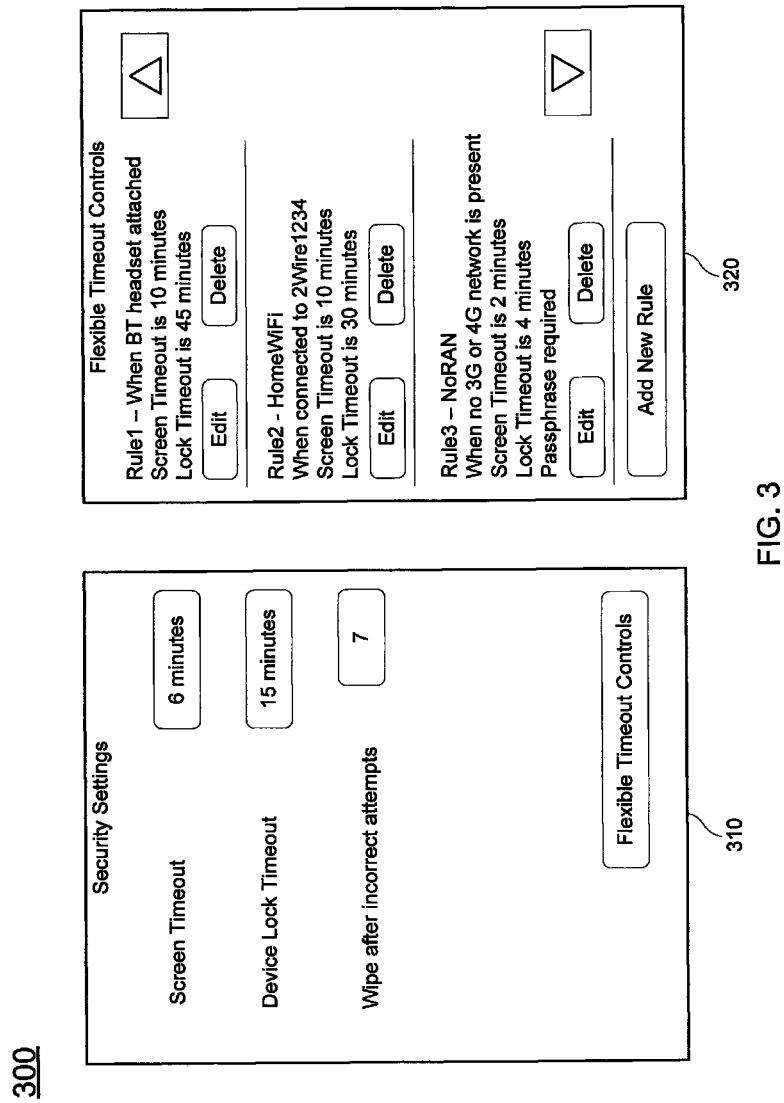
FIG. 3 illustrates exemplary screen displays of a device according to the present disclosure.

The method 200 begins in step 202 and proceeds to step 210. At step 210, the method 200 receives at least one condition and at least one modification for a device timeout parameter (e.g., of an endpoint device). For example, a user may configure a list of one or more flexible device timeout controls, i.e., a list of conditions and respective modifications/actions for one or more timeout parameters of the device. An exemplary list is illustrated on device screen 320 of FIG. 3. For example, a device may have a screen timeout parameter as well as a device lock timeout parameter. Each of the timeout parameters may comprise a duration of time from a last interaction with the device after which the respective timeout occurs. The respective timeout parameters may comprise default timeout parameters for the device. For example, device screen 310 in FIG. 3 illustrates a screen timeout parameter of 6 minutes and a device lock timeout parameter of 15 minutes. However, these default values may be modified via one or more flexible device timeout controls, e.g., input by a user of the device. For example, a user may access screen 320 via the flexible timeout control button shown on screen 310. The flexible timeout controls may comprise a list of one or more conditions and corresponding modifications and/or other actions to take in response to the condition being detected. For example, the first entry on screen 320 indicates that when a Bluetooth (BT) headset is attached (the "condition"), the screen timeout of the device should be 10 minutes (a "modification" or "action") and the device lock timeout should be 45 minutes (a second modification/action).

In one embodiment, the method 200 receives multiple conditions and corresponding modifications. For instance, as illustrated in screen 320 of FIG. 3, there are three entries, each with a condition and one or more corresponding modifications/actions. In one embodiment, each of the conditions has a priority with respect to the other conditions in the list. For example, in one embodiment conditions which are higher in the list take precedence over conditions which are lower in the list, or vice versa. In one embodiment, conditions which reduce a timeout parameter take precedence over conditions which increase the timeout parameter. In one embodiment, a modification may comprise an absolute time. For instance, a modification may explicitly define that the timeout parameter should be X minutes. However, a modification may also comprises a relative change to a timeout parameter, such as adding X minutes to the default value or to a previous state of the timeout parameter, thereby extending the timeout parameter an additional X minutes, and so forth.

Various conditions may be defined in embodiments of the present disclosure. For example, exemplary conditions for modifying a timeout parameter include: a location (e.g., at a distance from a certain point or within a particular geofence), a time of day, day of week or any other date/time attribute, a proximity to a radio frequency identification or near field communication element, a connectivity status of a wireless accessory (e.g., a Bluetooth headset), a presence or lack of presence of a particular access network, a presence or lack of presence of a particular access network type (e.g., a 3G network, a 4G network, a LTE network, a Wi-Fi network, or no cellular access network available), whether a particular Internet destination is reachable, whether a device is in motion, is not in motion, is moving above a certain rate or below a certain rate, whether a particular application on a device is open and/or in use, whether a public-private key validation can be completed, a device temperature, a battery level and so forth.

For example, many mobile endpoint devices will blank the screen and/or lock the screen, and also require a passcode/password to unlock the device after a short duration of time of inactivity. In other words, such devices have short screen timeouts and also short device lock timeouts. However, if a user of the device is driving a car and would like to access the device (preferably in a hands-free manner) it may be inconvenient as well as dangerous to require the user to swipe the screen or perform some other action to wake the screen and/or to also enter a passcode. As such, the user may wish to set a condition such that when the mobile device is proximate to or connected to a vehicle (e.g., via a Bluetooth connection), the mobile device should increase the passcode/device lock timeout parameter, e.g., up to 45 minutes, or to suspend the device lock timeout parameter completely. For example, the device lock timeout parameter may be continuously increased to 10 minutes when in the presence of the vehicle such that the timeout parameter never occurs so long as the device remains in the presence of the vehicle. FIG. 1 illustrates an example where endpoint device 110 may be in communication with a vehicle, e.g., near-field communication enabled device 199.

It should also be noted that the present disclosure is not limited to the foregoing example. Rather, conditions may be set with respect to numerous different types of near-field communication devices, as well as wired and wireless peripheral devices, and other types of devices. For instance, a user may wish to supersede a normal device timeout parameter when the device is in the presence of other near-field communication enabled devices, such as a global positioning system (GPS) device or other sensor(s), such as biometric sensors which feed information to the device during an exercise session or similar activity. In still another example, a condition may comprise the attachment or availability of a printer, a speaker, and so forth.

As another example, the user may wish to modify one or more timeout parameters of a device based on connectivity, or lack thereof, to a particular access network. Likewise, the user may wish to modify timeout parameters based upon a geographic location (e.g., as determined by an integrated GPS device, triangulation, base-station signal strength and direction estimation, and so forth). For example, a user may work on a secure campus of a business and is not concerned with leaving the device unlocked for long periods of time while the user is within the secure campus. However, when the user leaves work and is in less secure locations, he or she may prefer a more restrictive screen timeout, passcode and/or other timeout parameters.

In this regard, it should also be noted that in one embodiment at step 210, the method 200 may not receive inputs from the user of the device, but may instead receive inputs from a remote device such as an enterprise server (e.g., server 195 in FIG. 1) or an application server of a telecommunications service provider (e.g., AS 120 in FIG. 1). For example, a business may distribute a fleet of mobile devices to employees for use both on and off of the corporate premises. As such, the employer may provide itself with remote access to the devices to provision security updates, policy updates, and so forth. Accordingly, embodiments of the present disclosure may accept remote inputs regarding conditions and modifications to device timeouts at step 210. In one embodiment, a telecommunications service provider may manage device timeout policies on behalf of an enterprise or for its own benefit. In one embodiment, both a user of a device and an enterprise or a telecommunications service provider may provision device timeout controls of a device. For instance, a business may specify global maximum timeout parameters for all devices which are not to be exceeded. In turn, a user of each device may set one or more device timeout controls such as shown on screen 320 of FIG. 3. In one embodiment, the users' lists will be honored as long as the timeout parameters that are modified do not exceed the global maximums set by the business or service provider.

In one embodiment, the method 200 enables user-entered device timeout settings and/or remotely sourced device timeout settings (e.g., corporate settings) to supersede timeout settings requested by applications which may be running on the device. For example, while a default device screen timeout may be 45 seconds, a streaming video application may extend the timeout indefinitely until after a video ends or a streaming session ends. However, a corporate policy may specify that screen timeout should be at most 10 minutes and passcode/device lock timeout should be at most 15 minutes. As such, the corporate policy may override the application. Similarly, in one embodiment remote device timeout settings (e.g., based on corporate policy) may supersede user defined device timeout settings. For example, a user may wish to extend a device timeout setting to say 2.5 hours, when streaming video is playing to accommodate the length of the entire movie. However, the employer may wish to limit the time that employees are able to watch videos. Thus, in one embodiment, the employer may transmit a device timeout setting to one or more devices being used by employees that sets a device timeout parameter (e.g., a screen blank parameter) to only 15 minutes (the "modification") when a streaming video application is in use (the "condition").

As still another example, a condition (and associated modification) may comprise that when no cellular network data connection is available, one or more of the device timeout parameters should be lowered. For instance, the user (or employer) may be of the opinion that data exchanged over a cellular access network is more secure than over a Wi-Fi connection. As such, when it appears that there is no cellular data connection available and that the user may be using a less secure Wi-Fi connection, a more restrictive timeout parameter may be desirable.

In one embodiment, the condition may comprise a compound condition. For example, a condition may comprise that when LTE network access is available and when the device is located in the United States, the device lock timeout should be 30 minutes. As another example, a condition may comprise that when the device is not in motion (or is below a threshold speed (e.g., below five meters/second)) and when the time of day is between 8:00 am and 6:00 pm, the screen timeout should be 30 minutes. For example, the user may be a doctor who uses a mobile device to assist in meeting with, diagnosing and treating patients. As long as the device is not moving very fast (e.g., at a walking pace, or less than typical driving speeds) and as long as the time is within business hours, the screen timeout should be fairly long.

At step 220, the method 200 implements timeout functions. For example, the method may maintain one or more timeout parameters, e.g., a screen lock timeout parameter and a device lock timeout parameter. Accordingly, the method 200 may keep track of an elapsed time since a last user interaction with a device in order to compare to the one or more timeout parameters. For example, the method may note an elapsed time since a last key press, screen swipe, voice command, and so forth.

At step 230, the method 200 determines whether the at least one condition received at step 210 is encountered. Exemplary conditions are described above in connection with step 210. Thus, at step 230, the method may determine whether any one or more of such conditions are encountered. As an example, at step 230, the method 200 may determine whether or not a device is connected to a particular access network (e.g., a corporate local area network). For example, a user may arrive at an office in the morning. Thus, at step 230, the method may detect that the device is connected to, or may detect that a connection is available to the corporate network. If no conditions received at step 210 are encountered, the method proceeds to step 250. However, if at least one condition is encountered, the method proceeds to step 240.

At step 240, the method applies the at least one modification to the at least one timeout parameter. For example, if the condition comprises a connection to a particular access network and the modification comprises setting the timeout parameter to 10 minutes, then timeout parameter is set to 10 minutes. Following step 240, the method proceeds to step 250

At step 250, the method 200 determines whether one or more of the timeout parameters are satisfied. For example, the method may be keeping track of an elapsed time since a last interaction with a device according to step 220. Thus, in one embodiment at step 250 the method compares the elapsed time to one or more of the current timeout parameters. If the elapsed time is greater than or equal to any one or more of such timeout parameters the method proceeds to step 260. However, if none of the one or more timeout parameters is satisfied, the method returns to step 220. Notably, the steps, functions and/or operations of the method 200 may continue for several iterations. For example, the method 200 may operate continuously until at least one timeout parameter of a device is satisfied.

At step 260, the method 200 performs at least one action when the at least one timeout parameter is satisfied. In one embodiment, the at least one action comprises a power saving and/or a security action. For instance, if a screen timeout parameter is determined to be satisfied at step 250, then step 260 may comprise blanking and/or locking the screen. For example, the screen may go dark and may also present a swipe bar or other mechanism for the user to re-awaken the device. Such action may conserve battery life of a device while at the same time preventing unauthorized persons from viewing information left on the screen. In addition, by requiring a swipe, gesture or other mechanism to awake the device, it may prevent the user from inadvertently placing telephone calls, accessing data and using data allotments, and consuming battery life. Likewise, if a device lock timeout parameter is determined to be satisfied at step 250, then step 260 may comprise requiring a passcode/password for any subsequent access to the device.

Following step 260, the method 200 proceeds to step 295 where the method ends.

Figure 4:
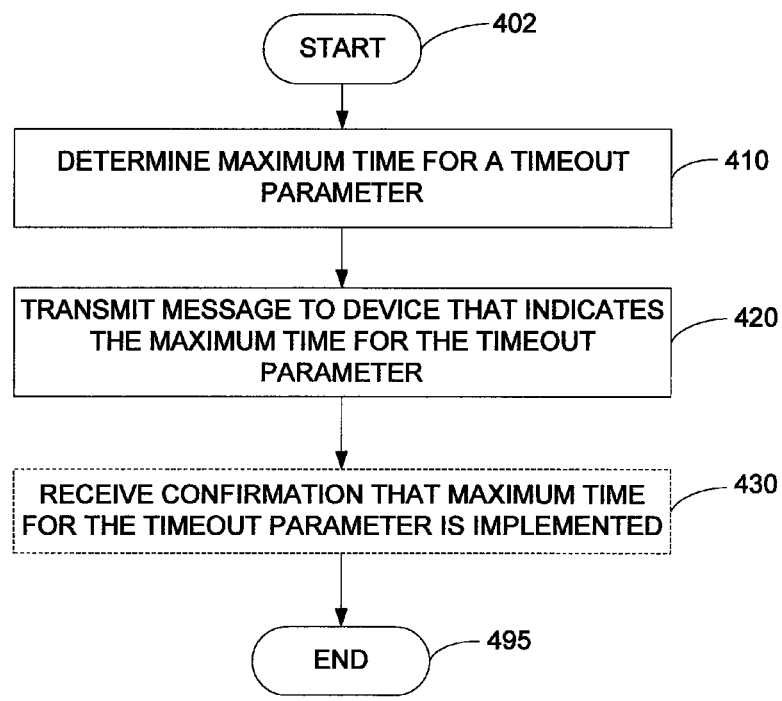
FIG. 4 illustrates a flowchart of an additional method for controlling a device timeout parameter according to the present disclosure.

FIG. 4 illustrates a flowchart of a method 400 for controlling a device timeout parameter. In one embodiment, the steps, operations or functions of the method 400 may be performed by any one or more of the components of the network 100 depicted in FIG. 1. For example, in one embodiment, the method 400 is performed by application server 120. In another embodiment, the method 400 is performed by server 195. Alternatively, one or more steps, operations or functions of the method 400 may be implemented by a general purpose computer having a processor, a memory and input/output devices as illustrated below in FIG. 6, specifically programmed to perform the steps, functions and/or operations of the method. Although any one of the elements in core network 125, wireless access network 105A and/or wireless access network 105B, may be configured to perform various steps, operations or functions of the method 400, the method will now be described in terms of an embodiment where operations of the method are performed at a server.

The method 400 begins in step 402 and proceeds to step 410. In step 410, the method determines a maximum value, or maximum time for at least one timeout parameter. For example, a business, organization, enterprise or similar entity may deploy a fleet of one or more devices to users associated with the enterprise. In addition, the enterprise may wish to impose limits on timeout parameters implemented on each device. Thus, in one embodiment the method 400 may receive global timeout parameter limits which are to be implemented on all or a portion of the fleet of devices. In one embodiment, the timeout parameter comprises a screen timeout parameter, e.g., for blanking and/or locking a screen. In another embodiment, the timeout parameter comprises a passcode/device lock timeout parameter, e.g., for requiring a password to access the device if the timeout parameter is satisfied. In still another embodiment, the method 400 pertains to both types of timeout parameters, or even additional types of timeout parameters, such as: a timeout parameter for completely turning off a device, a timeout parameter for turning off one or more peripheral devices or disabling a link to one or more peripheral devices, e.g., an attached speaker, and so forth.

In one embodiment, a telecommunications service provider may specify the maximum value for the at least one timeout parameter. For example, a telecommunications service provider may wish to implement certain restrictions on how devices interact with its network. As such, the service provider may offer devices to subscribers/users that are configured to accept periodic policy updates, security updates and so forth (e.g., maximum timeout values) from the service provider. For example, the service provider may expend significant resources protecting the network from attacks and malicious behavior from devices which users/subscribers have allowed to become compromised. As such, the service provider may specify a maximum password timeout parameter of 10 minutes, for example. Thus, such a policy would prevent users from extending the password timeout parameter beyond 10 minutes and may help to reduce the number of devices connecting to the network that are compromised.

At step 420, the method 400 transmits a message to at least one device that indicates the maximum value, e.g., a maximum time for the timeout parameter. In one embodiment, the maximum value is sent during a registration session, or as part of a periodic policy update or security update (e.g., from a service provider or from a corporation/enterprise managing the device).

At optional step 430, the method 400 receives a confirmation that the maximum value is implemented. For example, the at least one device may send a response confirming that the device has received the message and has set the maximum value for the timeout parameter as a limit.

Following step 430, the method 400 proceeds to step 495 where the method ends. It should be noted that although the foregoing method 400 is described in connection with a maximum value for a timeout parameter, the present disclosure is not so limited. Thus, in another embodiment the method 400 may be performed with respect to a minimum value for such timeout parameter. Similarly, in another embodiment, the method 400 may involve the determining and transmitting of both maximum and minimum values for a timeout parameter.

Figure 5:
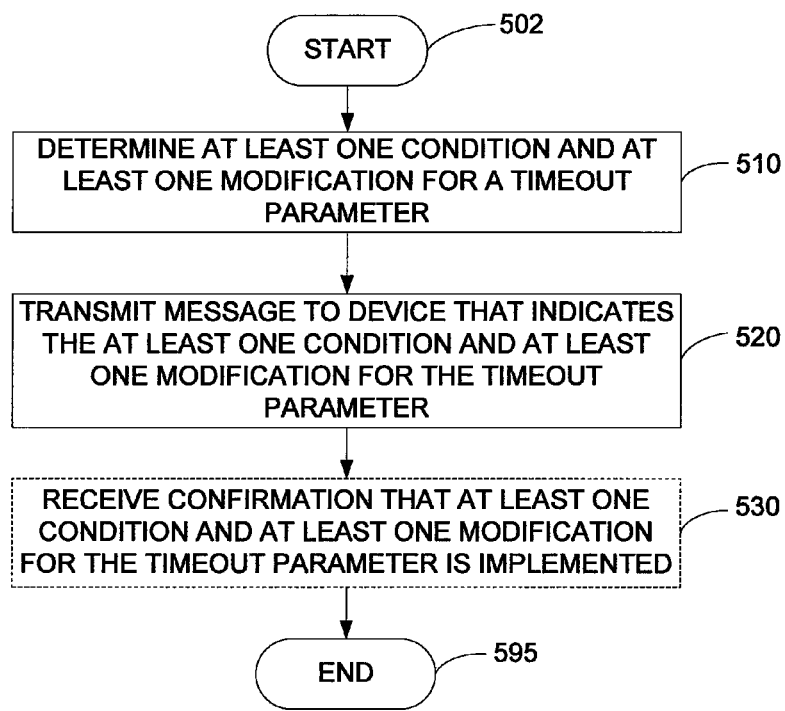
FIG. 5 illustrates a flowchart of another method for controlling a device timeout parameter according to the present disclosure.

FIG. 5 illustrates a flowchart of still another method 500 for controlling a device timeout parameter. In one embodiment, the steps, operations or functions of the method 500 may be performed by any one or more of the components of the network 100 depicted in FIG. 1. For example, in one embodiment, the method 500 is performed by application server 120. In another embodiment, the method 500 is performed by server 195. Alternatively, one or more steps, operations or functions of the method 500 may be implemented by a general purpose computer having a processor, a memory and input/output devices as illustrated below in FIG. 6, specifically programmed to perform the steps, functions and/or operations of the method. Although any one of the elements in core network 125, wireless access network 105A and/or wireless access network 105B, may be configured to perform various steps, operations or functions of the method 500, the method will now be described in terms of an embodiment where operations of the method are performed at a server.

The method 500 begins in step 502 and proceeds to step 510. In step 510, the method determines at least one condition and at least one modification for a timeout parameter. In one embodiment, the at least one condition and the at least one modification may comprise any of the exemplary conditions and corresponding modifications/actions described above in connection with step 210 of the method 200. In one embodiment, the method 400 receives the at least one condition and the at least one modification from a telecommunications service provider, a business, organization, enterprise or other entity for implementation on one or more endpoint devices associated with the enterprise (e.g., on a subscriber's or employee's smartphone, tablet computer, etc.).

At step 520, the method 500 transmits a message to at least one device that indicates the at least one condition and at least one modification. For instance, the message may request that the condition and modification be added to a list of device timeout controls associated with one or more timeout parameters implemented on the at least one device.

At optional step 530, the method 500 receives a confirmation that the at least one condition and at least one modification have been included on the list or other data structure for implementation on the at least one device.

Following step 530, the method 500 proceeds to step 595 where the method ends.

In addition, although not specifically specified, one or more steps, functions or operations of the respective methods 200, 400 and 500 may include a storing, displaying and/or outputting step as required for a particular application. In other words, any data, records, fields, and/or intermediate results discussed in the methods can be stored, displayed and/or outputted either on the device executing the methods 200, 400 or 500, or to another device, as required for a particular application.

Furthermore, steps, blocks, functions or operations in FIGS. 2, 4 and 5 that recite a determining operation or involve a decision do not necessarily require that both branches of the determining operation be practiced. In other words, one of the branches of the determining operation can be deemed as an optional step. Furthermore, steps, blocks, functions or operations of the above described methods can be combined, separated, and/or performed in a different order from that described above, without departing from the example embodiments of the present disclosure.

Figure 6:
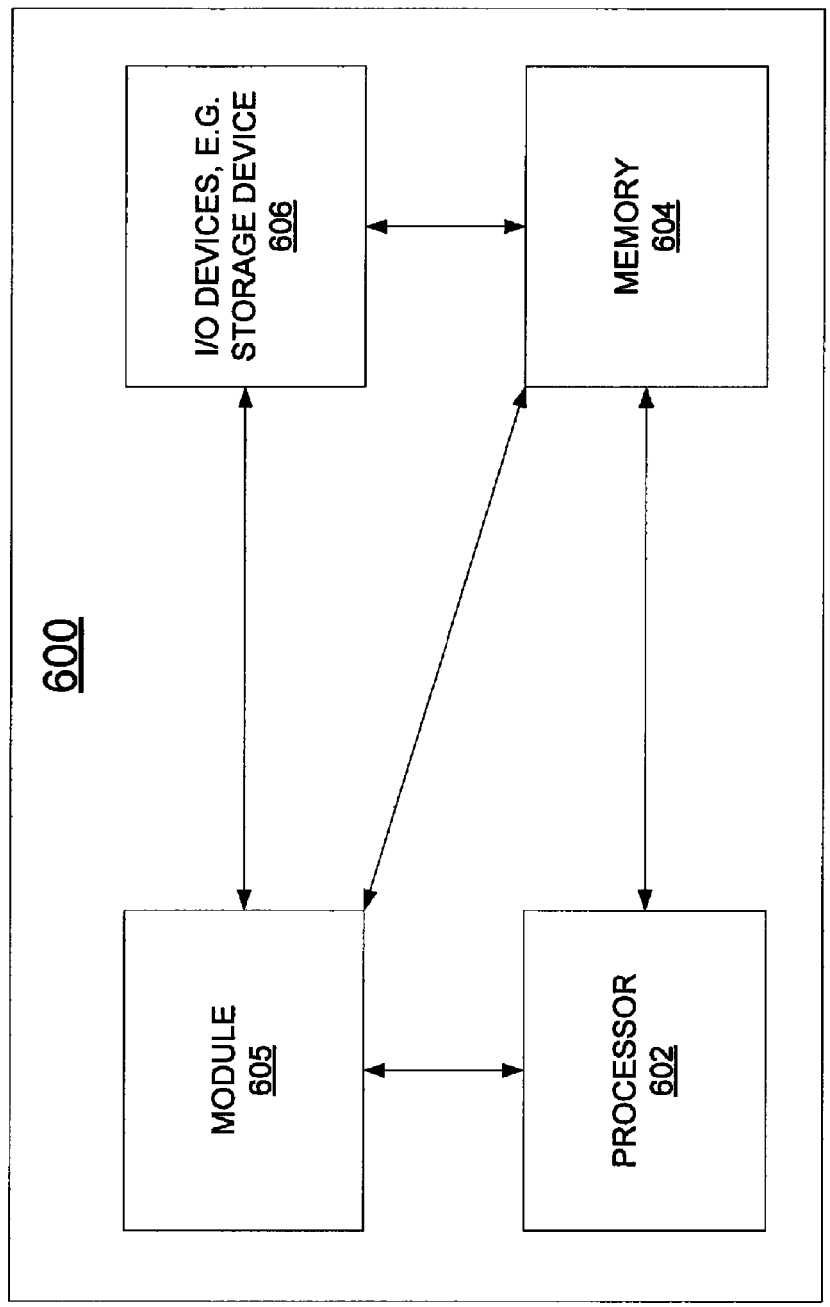
FIG. 6 illustrates a high-level block diagram of a general-purpose computer suitable for use in performing the functions, methods, operations and algorithms described herein.

FIG. 6 depicts a high level block diagram of a general purpose computer or system suitable for use in performing the functions described herein. For example, any one or more components or devices illustrated in FIG. 1 or described in connection with the methods 200, 400 and 500 may be implemented as the system 600. As depicted in FIG. 6, the system 600 comprises a hardware processor element 602 (e.g., a microprocessor, a central processing unit (CPU) and the like), a memory 604, (e.g., random access memory (RAM), read only memory (ROM) a disk drive, an optical drive, a magnetic drive, and/or a Universal Serial Bus (USB) drive), a module 605 for controlling a device timeout parameter, and various input/output devices 606 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that embodiments of the present disclosure can be implemented in software and/or in a combination of software and hardware, e.g., using application specific integrated circuits (ASIC), a general purpose computer or any other hardware equivalents, e.g., computer readable instructions pertaining to the methods discussed above can be used to configure a hardware processor to perform the steps, functions and/or operations of the above disclosed methods. In one embodiment, the present module or process 605 for controlling a device timeout parameter can be implemented as computer-executable instructions (e.g., a software program comprising computer-executable instructions) and loaded into memory 604 and executed by hardware processor 602 to implement the functions as discussed above in connection with the exemplary methods 200, 400 and 500 respectively. As such, the present module or process 605 for controlling a device timeout parameter as discussed above in respective methods 200, 400 and/or 500 (including associated data structures) can be stored on a non-transitory (e.g., tangible or physical) computer readable storage medium, e.g., RAM memory, magnetic or optical drive or diskette and the like.

It should be noted that the hardware processor can be configured or programmed to cause other devices to perform one or more operations as discussed above. In other words, the hardware processor may serve the function of a central controller directing other devices to perform the one or more operations as discussed above.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A device for controlling a timeout parameter, comprising:
   a processor; and
   a computer-readable medium in communication with the processor, the computer-readable medium storing instructions which, when executed by the processor, cause the processor to perform operations, the operations comprising:
      receiving a condition for modifying the timeout parameter and a modification, wherein the condition comprises an available connection to a particular type of network and wherein the modification comprises an increase of the timeout parameter;
      detecting the condition for modifying the timeout parameter; and
      applying the modification to the timeout parameter in response to the detecting the condition.

2. The device of claim 1, wherein the condition is one of a plurality of conditions that is set by the processor.

3. The device of claim 2, wherein each of the plurality of conditions has a priority in relation to the other conditions.

4. The device of claim 2, wherein a condition that decreases the timeout parameter has a precedence over a condition that increases the timeout parameter.

5. The device of claim 1, wherein the timeout parameter is a default duration of time.

6. The device of claim 1, wherein an additional modification comprises a decrease of the timeout parameter.

7. The device of claim 1, wherein an additional condition comprises a proximity to a vehicle.

8. The device of claim 7, wherein the proximity to the vehicle is determined via a near-field communication.

9. The device of claim 1, wherein an additional condition comprises a geographic location.

10. The device of claim 1, wherein an additional condition comprises a time of day.

11. The device of claim 1, wherein an additional condition comprises a connection to a particular type of accessory.

12. The device of claim 1, wherein the operations further comprise:
    locking a screen when the timeout parameter is satisfied.

13. The device of claim 1, wherein the operations further comprise:
    blanking a screen when the timeout parameter is satisfied.

14. The device of claim 1, wherein the operations further comprise:
    requesting a passcode for a subsequent access to a device when the timeout parameter is satisfied.

15. The device of claim 1, wherein the processor comprises a processor of an endpoint device.

16. A method for controlling a timeout parameter of a device, comprising:
    determining, by a processor, a condition for modifying the timeout parameter of the device and a modification, wherein the condition comprises an available connection to a particular type of network and wherein the modification comprises an increase of the timeout parameter; and
    transmitting, by the processor, a message to the device indicating the condition for modifying the timeout parameter of the device and the modification.

17. The method of claim 16, further comprising:
    receiving a response confirming that the condition for modifying the timeout parameter of the device and the modification are implemented on the device.

18. A non-transitory computer-readable medium storing instructions which, when executed by a processor, cause the processor to perform operations for controlling a timeout parameter of a device, the operations comprising:
    receiving a condition for modifying the timeout parameter and a modification, wherein the condition comprises an available connection to a particular type of network and wherein the modification comprises an increase of the timeout parameter;
    detecting the condition for modifying the timeout parameter; and
    applying the modification to the timeout parameter in response to the detecting the condition.

* * * * *